United States Patent
Ratiner et al.

(10) Patent No.: US 8,219,579 B2
(45) Date of Patent: Jul. 10, 2012

(54) EXPANSION OF SEARCH QUERIES USING INFORMATION CATEGORIZATION

(76) Inventors: Michael Ratiner, Holon (IL); Dmitry Kuharenko, Staten Island, NY (US); Alexander Rubinov, Holon (IL)

(*) Notice: Subject to any disclaimer, the term of this patent is extended or adjusted under 35 U.S.C. 154(b) by 0 days.

(21) Appl. No.: 13/170,391

(22) Filed: Jun. 28, 2011

(65) Prior Publication Data

US 2011/0258173 A1 Oct. 20, 2011

Related U.S. Application Data

(63) Continuation-in-part of application No. 12/328,602, filed on Dec. 4, 2008, now abandoned.

(51) Int. Cl.
*G06F 7/00* (2006.01)
*G06F 17/30* (2006.01)
(52) U.S. Cl. ........................................ 707/769; 707/803
(58) Field of Classification Search ........... 707/600–831
See application file for complete search history.

(56) References Cited

U.S. PATENT DOCUMENTS

| | | | | |
|---|---|---|---|---|
| 6,453,312 | B1* | 9/2002 | Goiffon et al. ........................ 1/1 |
| 7,707,152 | B1* | 4/2010 | Greenfield et al. ........ 707/999.1 |
| 7,716,199 | B2* | 5/2010 | Guha ............................ 707/706 |
| 2007/0038601 | A1* | 2/2007 | Guha ................................ 707/3 |

OTHER PUBLICATIONS

Xiaohui Long et al., Optimized Query Execution in Large Search Engines with Global Page Ordering, 2003, Google Scholar, 12 pages.*

* cited by examiner

*Primary Examiner* — Jean B Fleurantin
(74) *Attorney, Agent, or Firm* — The Law Office of Michael E. Kondoudis

(57) ABSTRACT

A computerized system and method of constructing and expanding search queries for conducting searches through information sources. The system enables retrieving a category options tree, allowing a user to define a category route by selecting a category-node, which defines a search-category. The system may further enable retrieving a query scenario tree, having a hierarchal structure comprising query nodes, where the retrieved query scenario tree is associated with an initial input query, inputted by a user. Each query node defines a query route enabling to construct the content and structure of an expanded search query. The system enables selecting a query node of the retrieved query scenario tree, according to an online decision making process, which analyses the search-category in relation to available query routes in to allow selecting a query node from the retrieved scenario tree that is most compatible with the search-category.

14 Claims, 8 Drawing Sheets

EXPANSION OF SEARCH QUERIES USING INFORMATION CATEGORIZATION

CROSS-REFERENCE TO RELATED PATENT APPLICATIONS

This application is a continuation in part (CIP) of U.S. patent application Ser. No. 12/328,602, which is incorporated herein by reference in its entirety.

BACKGROUND

1. Field of the Invention

The present invention relates generally to the field of systems, methods and search engines for information retrieval based on hierarchic data knowledge and more particularly to systems, methods and search engines enabling dynamic searches by enabling dynamic expansion of input search queries.

2. Discussion of Related Art

Search engines are targeted at retrieving information from databases, organized according to different hierarchies, pertaining to an input query inserted by a user. The input query is usually textual (a word or a combination of words), where the search engine usually "reads" the text query according to predefined rules enabling the engine to search through the data sources according to keywords in the text and according to the structure of the input query.

Search engines are often scaled according to the relevancy of information they enable to retrieve in relation to the input query complexity and/or according to the way they facilitate the user in building a query that will lead to a more relevant search results. Many websites charge advertisers for presenting their ads according to search queries and since the advertiser usually pays for each presentation. Therefore, it is highly important for advertisers to reach audiences that are more likely to be potential customers and avoid redundant charging.

To allow a more focused and relevant search through the enormous amount of data sources and data that is available, some search interfaces allow the user to input personal details such as gender, age, nationality, and the like and create a personal profile of the user to further facilitate in searching for information that relates to the personal details of the user in addition to his/her input query text. For example, the search results for a query input text "old movies" inputted by an American male at the age of fifty may be different from the results of a sixteen-year-old Swedish girl.

To further improve searching the data sources, many systems use hierarchic interfaces enabling users to build more structured and elaborated queries.

Unfortunately, those techniques require the user to input personal details, which the user may be reluctant to reveal.

Another downside to these techniques is that the personal input details that are received from the user may not be sufficient to all types of query options and may not be related to categories that can further facilitate in associating the right search results to the query of the user in relation to the user's input details.

SUMMARY

The present invention, according to some embodiments thereof, provides a system, a method and a search engine for constructing and expanding search queries and conducting searches through at least one information source.

According to some embodiments of the invention, the system and search engine may enable retrieving a category options tree, which is a hierarchal logic tree, which may or may not be graphically presented. The at least one category options tree may allow a user to define a category route, which defines a search-category.

The system may further enable a user to input an initial input query, which may comprise an initial textual input for the search. Upon receiving the input query, the system may enable retrieving a query scenario tree, having a hierarchal structure comprising query nodes, where the retrieved query scenario tree may be associated with the initial input query.

According to embodiments, each query node may comprise text that is associated with the initial input query, and where each query node may define a query route, defining the content of each node of the route and the relations between the nodes of the route, enabling to construct the content and structure of an expanded search query.

According to embodiments, the system may further enable selecting a query node of the retrieved query scenario tree, where the selection of the query node is carried out according to an online decision making process, which analyses the search-category in relation to the available query nodes and query routes in order to select a query node from the retrieved query scenario tree that is most compatible with the search-category. The system may then construct the expanded search query according to the query route defined by the selected query node.

According to embodiments, each new search requires the user to define a new search-category.

The selection of the query route and the determining of the search-category may be carried out according to predefined rules that may take into account statistical calculations of searching behavior of users, where each search-category, defined by a category route, indicates characteristics of the user in relation to the initial input query.

According to some embodiments of the invention, the computerized system may comprise a search engine; at least one categories database; and at least one query scenario trees database. The search engine may enable users, using computerized communication devices, to use the search engine to search for information by communicating with the search engine through at least one data communication network.

The search engine may further enable the user to define a search-category to each new search, by presenting the user with a retrieved category options tree, retrieved from the categories database, which is a hierarchal tree comprising category nodes, where the category options tree allows the user to define a category route by selecting a category node defining the details of the user's search-category.

The search engine may further enable retrieving a query scenario tree from the at least one query scenario trees database that is associated with an initial input query, inputted by the user, where the input query comprises an initial textual input for the search. Each query scenario tree may comprise query nodes each comprising text associated with the input query, where the search engine may further enable constructing an expanded search query, which expands the input query, by selecting a query node out of the retrieved query scenario tree that is associated with the input query, according to an online decision making process, which analyses the search-category in relation to the query nodes and query routes in order to select a query node from the retrieved query scenario tree that is most compatible with the search-category; wherein the content and structure of the expanded search query is defined by the query route, which is defined by the selected query node.

The retrieval of each category options tree may be carried out by the search engine, according to predefined rules that take into account statistical calculations of searching behavior of users, wherein at least one of the search-categories, defined by at least one of the possible category routes, indicates characteristics of the user in relation to the initial input query.

According to some embodiments, the search engine may comprise (i) a graphical user interface (GUI) enabling the users to view and input data; (ii) a search-categorization module, enabling to define a search-category by retrieving of at least one category options tree, which is a hierarchal tree comprising category nodes, which define category routes, wherein each route defines a search-category and by allowing the user to select a category node from the retrieved options tree and thereby define a category route, which defines the search-category; a query scenarios retrieval module, enabling to retrieve at least one query scenario tree, which is a hierarchal tree comprising query nodes, each node defines a query route, wherein each query route defines an expanded search query, wherein the retrieval of the query scenario tree is carried out according to an initial input query, inputted by the user; (iii) a query expansion module, enabling to expand the initial input query, by selection of a query node out of the retrieved query scenario tree, wherein the selection is carried out according to an online decision making process, which analyses the search-category in relation to the available query nodes and query routes in order to select a query node from the retrieved query scenario tree that is most compatible with the search-category; and (iv) a search module, enabling to conduct searches through the at least one information source, according to the content and structure of the constructed search query.

At least one of the search-categories, defined by at least one of the possible category routes, may indicate characteristics of the user in relation to the initial input query.

These, additional, and/or other aspects and/or advantages of the present invention are: set forth in the detailed description which follows; possibly inferable from the detailed description; and/or learnable by practice of the present invention.

According to some embodiments of the present invention, there is provided a query builder operated by at least one processing unit for supporting query building processes The query builder comprises a categorization module, which allows constructing a categorization scenario, which is a logic tree of search categories, wherein the categorization scenario represents statistical relations between categories, allowing the user to select a category therefrom; and a query scenario module, which receives a selected category and dynamically builds a query scenario corresponding to the selected category, said query scenario is a logic tree having nodes of search terms structured in a hierarchal manner that represents interrelations between the search term nodes, where the interrelations are determined according to the selected category and according to browsing statistics relating to searches done by users, wherein upon selection of a node therefrom a search query is automatically created comprising all search terms that are interrelated to the selected node according to the hierarchal structure of the query scenario.

According to additional or alternative embodiments of the present invention, there is provided a computer implemented method of supporting search queries building processes the method includes providing a categorization scenario, which is a logic tree of search categories, where the categorization scenario represents statistical relations between categories, using a query builder operated by at least one processing unit to create and present the categorization scenario Once the categorization scenario is presented, the user can manually select a category from the categories scenario by selecting a node therefrom. A query scenario, corresponding to the selected category, is dynamically built, where the query scenario is a logic tree having nodes of search terms structured in a hierarchal manner that represents interrelations between the search term nodes, the interrelations are determined according to the selected category and according to browsing statistics, wherein the query builder builds and presents the query scenario The user can manually select a node of the query scenario to define a search query thereby, where a search query is automatically created by the query builder, comprising all search terms related to the node according to the hierarchal structure thereof.

According to additional or alternative embodiments of the present invention, there is provided a system for supporting query building processes The system comprises: at least one database comprising categories and information associated with interrelations between the categories for enabling to construct categories scenarios thereby; and at least one processing unit that operates a query builder, which enables assisting a user in building a search query by constructing a categorization scenario using the database and presenting thereof to the user, the categories scenario is a logic tree of search categories, which represents statistical relations between categories and dynamically building a query scenario for each category defined by the user by selecting a category form the categories scenario, the query scenario is a logic tree having nodes of search terms structured in a hierarchal manner that represents interrelations between the search term nodes, the interrelations are determined according to the selected category and according to browsing statistics relating to searches done by users, wherein upon selection of a node therefrom a search query is automatically created, the search query comprises all search terms that are interrelated to the selected node according to the hierarchal structure of the query scenario.

BRIEF DESCRIPTIONS OF THE DRAWINGS

The subject matter regarded as the invention will become more clearly understood in light of the ensuing description of embodiments herein, given by way of non-limiting example and for purposes of illustrative discussion of the present invention only, with reference to the accompanying drawings, wherein FIG. 1 is a block diagram, schematically illustrating a system comprising a search engine for constructing search queries and conducting searches, according to some embodiments of the invention;

FIG. 2 schematically illustrates a category options tree for enabling a user to define a search-category, according to some embodiments of the invention;

FIG. 3 schematically illustrates a query scenario tree and the process according to which a query node is selected, according to some embodiments of the invention;

DETAILED DESCRIPTION

Figure 1:
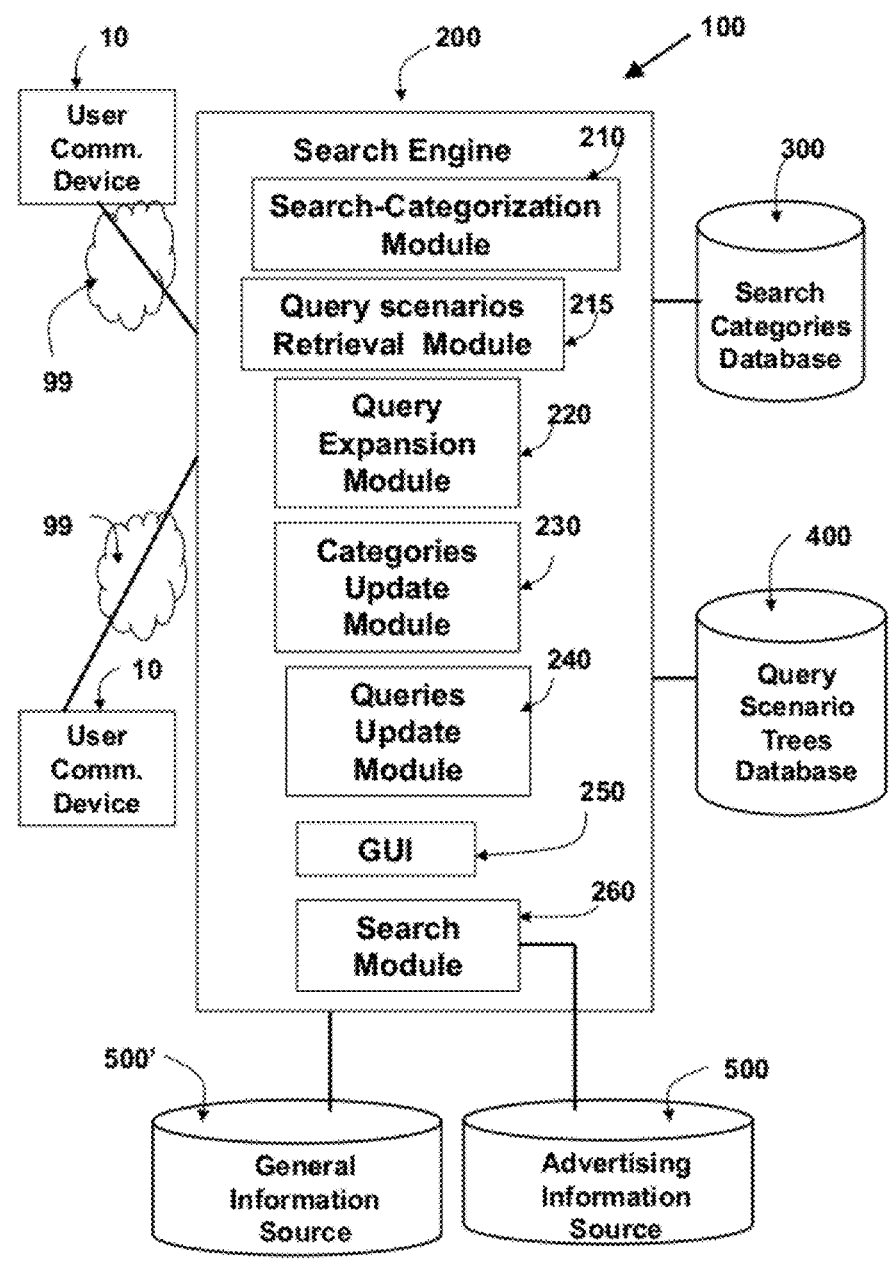

While the description below contains many specifications, these should not be construed as limitations on the scope of the invention, but rather as exemplifications of the preferred embodiments.

The scope of the invention should be determined not by the embodiments illustrated, but by the appended claims and their legal equivalents.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention, in some embodiments thereof, provides a computerized system 100, method and a search engine 200 for expending search queries for searching efficiently through various information sources available through at least one data communication network 99.

FIG. 1 is a block diagram, schematically illustrating a computerized system 100 for constructing and expending of search queries and conducting searched through various information sources using the constructed search queries, according to some embodiments of the invention.

As illustrated in FIG. 1, the system 100 may comprise a search engine 200, at least one search categories database 300 and at least one query scenario trees database 400.

According to embodiments, the search engine 200 may enable retrieving data from the databases 300 and 400.

The search engine 200 may enable users, using computerized communication devices 10, to use the search engine 200 to search through at least one information source 500/500' for information by communicating with the search engine 200 through the at least one data communication network 99, as known in the art.

The users' communication devices 10 may be of any variety and kind known in the art that enable retrieval, transmission and presentation of data, such as CPs, laptops, PDAs, cellular phones with access to the wireless application protocol (WAP) or any other network.

The communication networks 99 that can be used are all available networks 99 known in the art that allow transmission of data therethrough in known protocols such as the internet, the WAP, the intranet etc.

According to embodiments, the search engine 200 may further enable the user to construct and expand a search query by defining a search-category to be associated with the search.

According to embodiments, the search-category may be defined by retrieving at least one category options tree, which is a hierarchal logic tree, from the at least one search categories database 300.

The at least one category options tree may allow the user to define a category route (a logic route of the tree) defining the search-category of the particular search session, by selecting a category-node of the category options tree.

According to some embodiments of the invention, the system 100 may further enable retrieving at least one query scenario tree, from the query scenario trees database 400, which is another logic tree representing possible query structures and content, once the user inputs an initial input query, which may comprise an initial textual input for the search.

The query scenario trees in the database 400 may be constructed and/or updated according to various methods, e.g. based on statistical calculations that allow constructing the logical query routes.

According to embodiments, as illustrated in FIG. 1, the search engine may comprise at least some of: a search-categorization module 210; a query scenario trees retrieval module 215; a query expansion module 220; a graphical user interface (GUI) 250; a search module 260; a categories update module 230; and a queries update module 240.

According to embodiments, the search-categorization module 210, may enable defining a search-category 30 for each search, by retrieving a categories option tree 310 from the at least one search categories database 300, by allowing the user to select a category node 311, which defines a category route 320 which defines the search-category 30.

According to embodiments, the query scenario trees retrieval module 215 may enable retrieving of at least one query scenario tree 410 from the at least one search query scenario trees database 400, once a textual initial input query is inputted by a user. The search for the query scenario tree 410 that is associated with the text of the input query may be carried out according to any method and algorithm that allows logical associating of text to predefined query scenario trees 410.

According to embodiments, the query expansion module 220, may enable expanding the inputted initial input query by constructing of an expanded search query 50, according to the input query and according to the defined search-category 30. The expansion may be carried out by selecting a query node (carried out automatically be the system) of the retrieved query scenario tree. The selection of the query node may be carried out according to an online decision making process predefined at the expansion module 220, which analyses the search-category in relation to the available query nodes and query routes in order to select a query node from the retrieved query scenario tree that is most compatible with the search-category.

According to embodiments, the graphical user interface (GUI) 250 may be operatively associated with all other modules of the search engine 200, enabling the user to input the initial input query 20, presenting the category options trees 310 and allowing the user to select category nodes 311, presenting the expanded search query and the search results according to predefined graphical configuration and rules (e.g. predefined priorities), etc.

According to embodiments, the search module 260 may allow conducting the searches through the at least one information source 500' and/or 500, according to the content and structure of the expanded search query 50.

According to embodiments, the update module 230 may enable updating the structure and content of the category options trees 310 according to new knowledge acquired by the system 100 (e.g. more statistical analysis and/or new studies and methods in analyzing the behavioral information relating to users' searching behavior). The updating may include adding new category options trees 310 and/or updating existing ones (e.g. by adding/removing nodes 311).

According to embodiments, the queries update module 240 may enable updating the structure and content of the query scenario trees 410 according to new knowledge acquired by the system 100 (e.g. more statistical analysis and/or new studies and methods in analyzing the behavioral information relating to users' searching behavior in relation to query construction). The updating may include adding new query scenario trees 410 and/or updating existing ones (e.g. by adding/removing/replacing nodes 411 and/or by redefining the relations between each two connected nodes 411).

Figure 2:
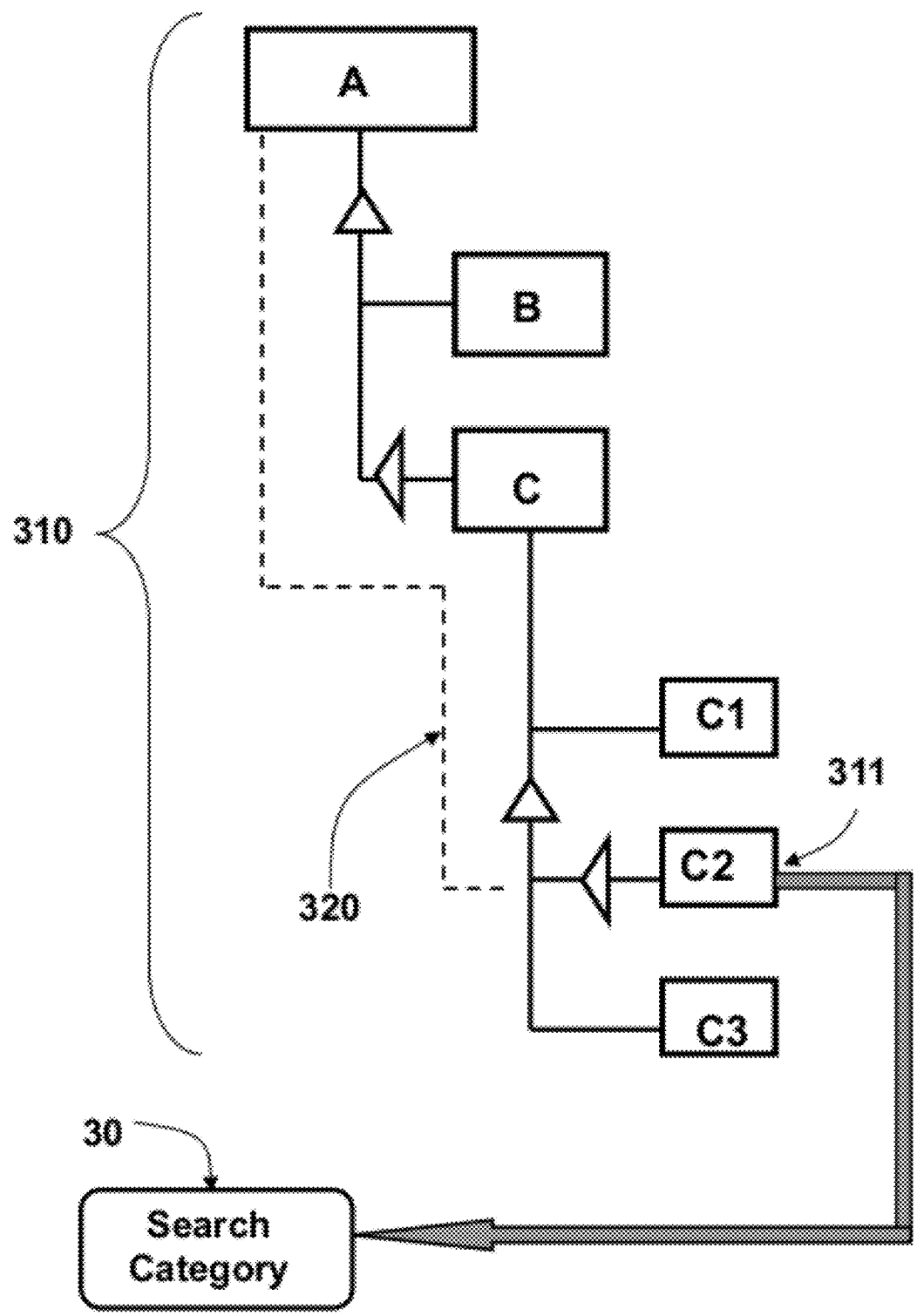

FIG. 2 schematically illustrates the structure and logics of a category options tree 310, according to some embodiments of the invention. The category options tree 310 may be a graphical logic tree graphically presenting category nodes 311 which may be graphical predefined images/pictures or media such as animation or video. As illustrated in FIG. 2, each category options tree 310 may comprise category nodes 311 each category node 311 representing a route 320 defining all the nodes 311 that relate to the selected one and the relations between the route's 320 nodes 311. Each route 320 may be associated with a different search-category 30, according to predefined rules that may take into account, for instance, statistical calculations and/or studies of searching behavior of users, where each search-category, defined by a category route, indicates, inter alia, characteristics of the user, without requiring the user to identify personal details such as his age, name, sex and the like.

The statistical calculations and/studies of users searching behaviors may include social studies of already known user's profiles and their search histories and/or according to the users searching usage and/or feedback, when using the system 100.

At least one of the search-categories 30, defined by at least one of the possible category routes 320, may indicate characteristics of the user. This means that the search-category 30 may represent a profile of the search session and/or a profile that characterizes the user in relation to the search the user is about seek. Each new search requires the user to define a new search-category 30 enabling later on to check, for example, the historical relations between the selected category and the input query for further updating the query scenario trees with more relevant relations between the content of the query nodes and the search-category 30.

For example, it may be discovered that all searches that related to search-categories 30 that included "a male user, under the age of twenty who likes ski and sports" are related in considerable statistical rate to input queries that relate to "cellular phones" and their expanded queries relate especially to "online games in cellular phones".

According to embodiments, the categories options tree 310 may be a graphical hierarchal options tree 310 enabling the user to graphically define the search-category by selecting a graphically presented category node 311 that defines a route 320, which is associated with a specific predefined search-category 30.

According to some embodiments, as illustrated in FIG. 1, at least one of the information sources may be an advertising information source 500, enabling to retrieve advertising information that is associated with the search-category 30 according to the content and structure of its associated search query 50.

According to embodiments, the system 100 may enable automatically retrieving of a query scenario tree 410 that is associated with the initial input query 20.

Figure 3:
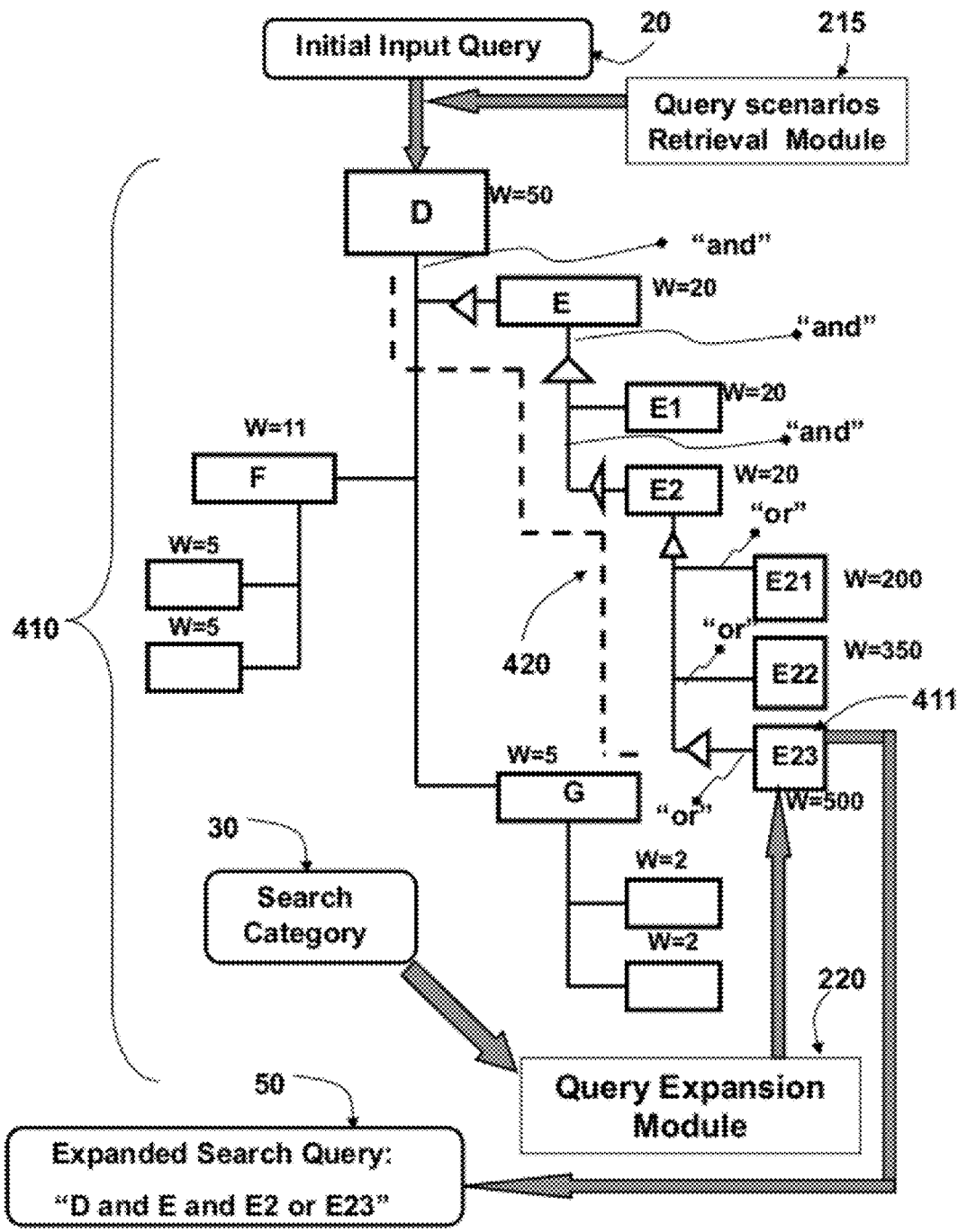

FIG. 3 schematically illustrates a query scenario tree 410 that is associated with an input query 20. The query scenario tree 410 may too be a logic tree comprising query nodes 411. Each query node 411 may be a textual phrase (one or more words) that can contribute added text to the expanded search query 50 that is being constructed. The positioning of each node 411 in relation to other nodes 411 on the same tree-branch may define the relations between the textual phrases (e.g. the relations between words e.g. "or", "and", etc.), where those relations may be predefined for each query tree 410. By selecting one query node 411, the user may define an entire query route 420 defining the content and structure (relations between text phrases) of the search query (meaning the textual phrases (words) and the relations between the words, respectively).

According to embodiments, as illustrated in FIG. 3, the query expansion module 220 of the search engine 200, may enable automatically retrieving of the associated query scenario tree 410 from the query scenario trees database 400, upon receiving an input query 20 from the user, and automatically selecting a query node 411 of the retrieved query scenario tree 410, where the selection of the query node 411 is carried out according to an online decision making process, which analyses the search-category in relation to the available query nodes 411 and query routes 420 of the tree 410 in order to select a query node 411 from the retrieved query scenario tree 410 that is most compatible with the search-category 30.

According to embodiments, as illustrated in FIG. 3, the decision making process for selecting the most compatible query node 411 may include online weighing of all the query nodes 411 of the retrieved query scenario tree 410 according to a predefined weighing algorithm, which takes into account the details of the search-category 30 in relation to the input query 20 and selecting the query node 411 that has the highest/best weight.

The weighing may be carried out according to any predefined technique, such as, for example, according to statistical calculations that calculate the statistical probability of each query node 411 to be suitable to the search-category 30 according to historical knowledge of users' searching behavior.

Each new search may require the user to define at least one new categorization of the search and therefore enable creating expanded search queries 50 that are more relevant to the subject of the search and can use much wider statistical behavioral knowledge to improve the query-content and detailing to enable better searches.

Figure 4:
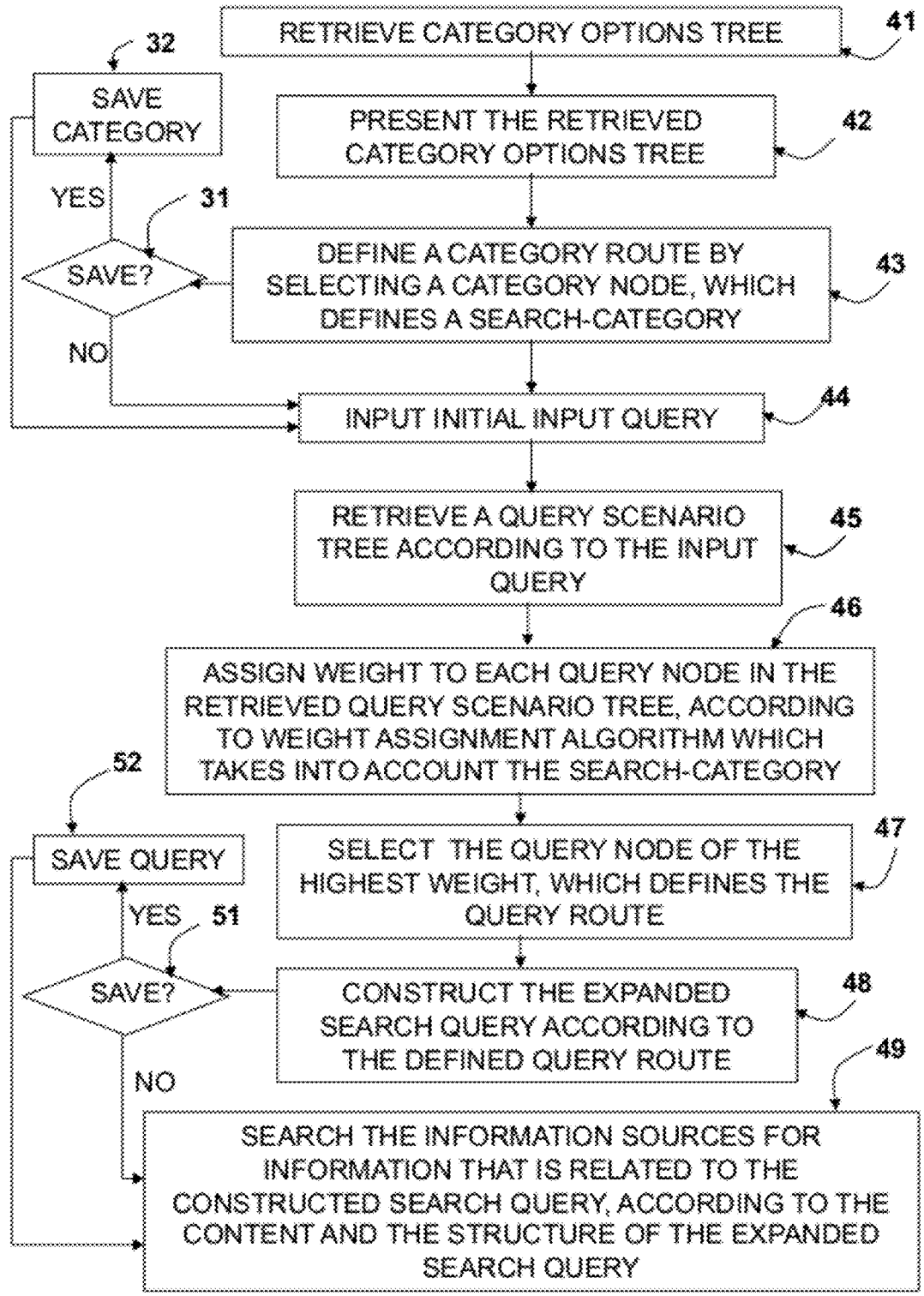
FIG. 4 is a flowchart, schematically illustrating a method for expanding a search query, according to some embodiments of the invention

FIG. 4 is a flowchart, schematically illustrating a method of expanding a search query and searching for information related thereto, according to some embodiments of the invention. According to these embodiments, the method may comprise at least some of the following:
Retrieving a category options tree 310 (e.g. from the at least one categories database 300) 41;
Presenting the retrieved category options tree 42;
Defining a category route 43, e.g. by selecting one category node 311 that defines the route 320, which defines the search-category 30;
Inputting an initial input query 44, which may be any text phrase (comprising one or more words) inputted by the user using his/her device 10, relating to the search subject;
Retrieving a query scenario tree 410 (e.g. from the at least one query scenario trees database 400) according to the input query 45;
Assign a weight value to each query node 411 of the retrieved query scenario tree 46, according to, for example, a weight assignment algorithm, which takes into account the defined search-category 30 associated with that search;
Selecting the query node 411 that has the highest weight 47, which defines the query route 420 that is the most compatible with the search-category 30;
Constructing an expanded search query 48 according to the defined query route 420 (which defines the structure and content of the query), the initial input query 20 and according to the associated search-category 30; and
Searching the at least one information sources 49 (e.g. the advertising information source 500 and/or the general information source 500') according to the content and structure of the constructed search query 50 and the search-category 30.

According to some embodiments, once a category route 320, defining a search-category 30, the defined search-category 30 may be save, where the search engine 200 may enable allowing the user to store all his/her defined categories 30 (see FIG. 4 steps 31-32).

Additionally or alternatively, once a query route 420, defining a search query 50, the defined search query 50 may be save, where the search engine 200 may enable allowing the user to store all his/her constructed search-queries 50 (see FIG. 4 steps 51-52).

According to embodiments, once the expanded search query 50 is constructed by the selection of the query node 411 that defines the most suitable query route 420 and query content and structure, in relation to the search-category 30, the system 100 may enable further expanding the expanded search query 50 by adding additional text that is determined according to an additional preferences algorithm, which takes into account the search-category 30.

According to some embodiments of the present invention, there are provided systems, methods and query builders for building search queries that can assist in improving searches through a network such as a search through the World Wide Web (WWW) through the internet and/or through any other communication network.

One objective of the present invention is to assist searches by allowing a user to build search queries that will help locating web pages that are most relevant to his/her search.

According to some embodiments of the present invention, the systems, methods and query builders enable creating and presenting a categorization scenario to a user upon receiving an input search query text and/or upon entering a search platform such as a search and/or a query building website and/or tool. The categories scenario is a logic tree of nodes each node represents a category. The logic tree of categories represents hierarchy of interrelations between various search categories. The hierarchy and interrelations are a result of calculations and accumulation of statistical relations between categories that users associate in their searches through the web. The categories scenario is presented to the user and allows him/her to manually select a category by selecting a node therefrom. Once a category node is selected by the user, a query scenario corresponding to the selected category is created and presented again to the user. The query scenario is yet another logic tree representing a hierarchal structure of statistical relations between nodes of search terms. According to some embodiments of the present invention, the query scenario is constructed according to the selected category and according to statistics that enable finding and relating previously used search terms and/or previously visited web pages containing information/content that is relevant to a specific search according to the selected category.

According to some embodiments of the present invention, the systems, methods and query builders may enable accessing data sources such as databases containing statistical information relating to web searches, for constructing the query scenarios (i.e. browsing information). For example, databases created through web crawling and web pages indexing processes may be accessed. Web crawling (also known in the art as spidering) refers to any process that allows storing information relating to visited web page such as processes that allow storing of visited web pages and/or visited web pages' links and optionally also statistical browsing information relating to each visited webpage such as search queries content leading to the specific webpage in each visitation thereof, the number of visits, the average visiting time of the webpage etc. Each web page information indication in the database may be indexed. The process of web pages' indexing refers to any process in each web page is associated with any one or more indexes such as categories, search terms, tags, and the like. The indexing enables building the query scenarios by associating each selected category with one or more indexes in the database. The hierarchy of the search term in the query scenario may be determined, for instance, using an algorithm that defines correlation levels between the selected category and each of the terms indicating the indexing of each web page as well as according to browsing statistics relating to each search term in relation to visiting statistics of the web pages.

According to some embodiments of the present invention, when a user selects a category node from the categories scenario the system will automatically allow using the category of the node and optionally all categories in the tree branch that lead to the selected node for building the query scenario associated therewith. The query scenario may contain nodes of search terms taken, where the search terms may be links titles of web pages, tags of web pages and/or terms from the content of web pages, for example. The structure of the query scenario logic tree may be defined according to correlations between the terms associated with the web pages and the selected category as well as according to statistical information relating to the terms of the web pages. For example, in addition to terms indicating each web page such as link title, each web page may further be associated with one or more statistical factors such as web page ranking calculated according to the number of times the web page was visited, the average duration of visitations the webpage, other web pages associated with this web page and/or any other factor that can give statistical browsing related information relating to the web page. This statistical information in combination with the correlation between the web page and the selected category, may be used to determine: (i) the nodes of the query scenario (e.g. the search terms themselves); and (ii) the interrelations between the nodes, which define the structure of the query scenario's logic tree.

According to some embodiments of the present invention, once the query scenario is built, it is presented to the user to allow the user to manually select a node therefrom. Once the node in the query scenario is selected, a search query is automatically created. The search query may include all search terms in the all the nodes associated with the selected one, such as all the nodes in the branch of the logic tree leading to the selected node and the term of the selected node. The interrelations between the terms in the search query such as and/or relations may be determined according to the interrelations between the nodes defined by the branch structure and hierarchy.

Since this search query is also based on statistics from other searches of users, it may be more effective when used for searching through the web than in cases in which the user has to guess terms that may be most relevant to his/her search.

A query builder is generally defined herein as a computer readable program/application that is a tool for assisting or supporting users in building effective search queries for web searches purposes.

The term "search query" refers to any combination of textual terms and/or visual combinations thereof. A textual term (also shortly referred to in this document as "term" may include one or more words or any other linguistic symbols combination.

Figure 5:
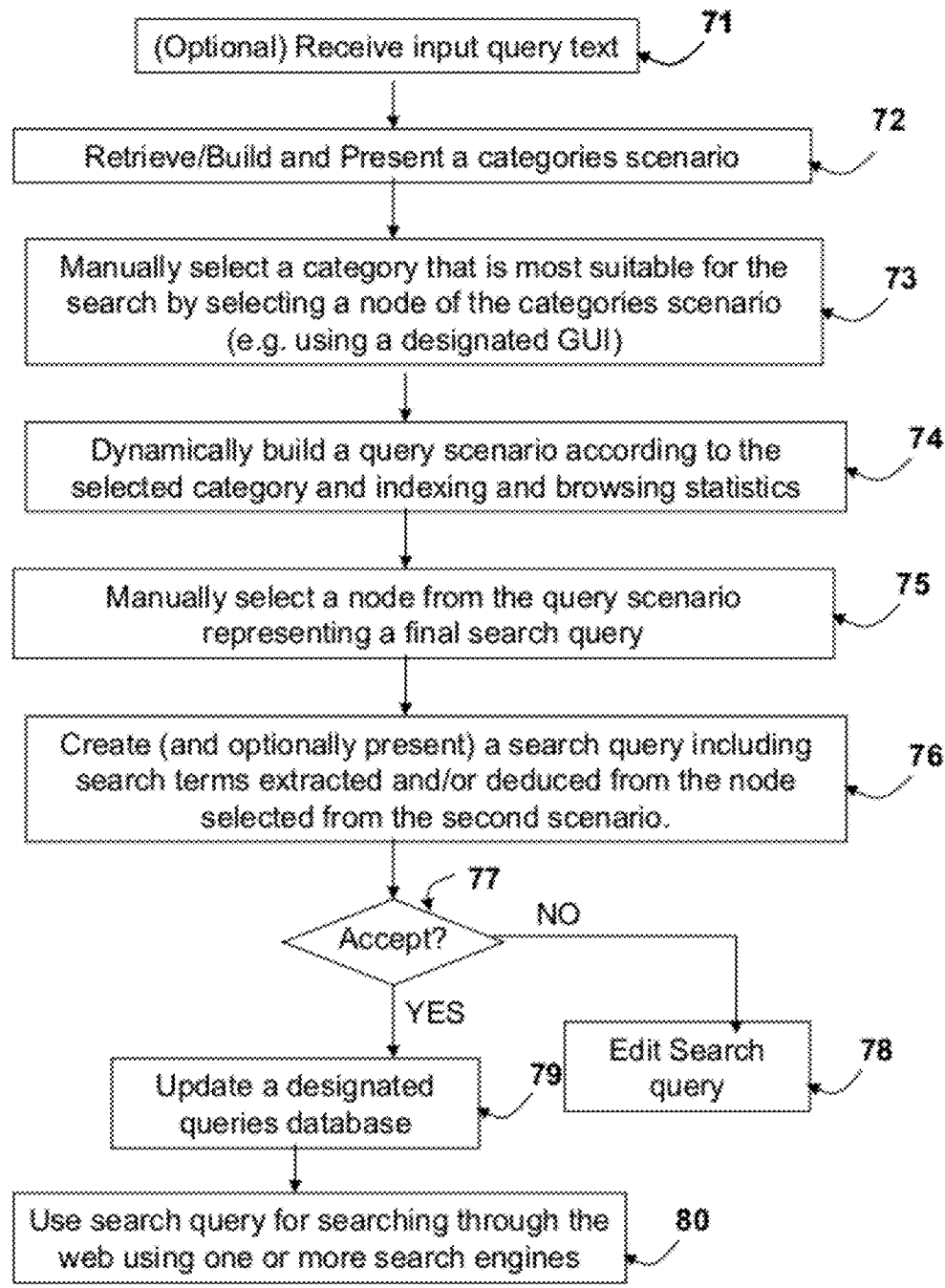
FIG. 5 is a flowchart, schematically illustrating a process for building a search query, according to some embodiments of the present invention.

Reference is now made to FIG. 5, which is a flowchart, schematically illustrating a process for building a search query, according to some embodiments of the present invention. The process may be carried out using a query builder, which may be any computer program/application operated by any one or more computerized processing units. According to this process, the user may input an initial query text 71 to begin the query building process. A categories scenario may be retrieved or built and presented corresponding to input query text 72. Alternatively or additionally, an initial categories scenario may be presented representing a general statistics of categories and interrelations therebetween. The categories scenario, as elaborated above, may be a logic tree having branches of nodes each node representing a category. The user may be required to manually select a category node from the categories scenario tree 73.

Once the category is selected 73, a query scenario is dynamically constructed/built (on-the-fly) 74 according to the selected category and according to statistical information relating to users' web searches. The constructing of the query scenario may be carried out by the query builder by accessing one or more databases which are built and updated based on web crawling and web pages' indexing providing an up-to-date statistics of web pages' related information relating both to the browsing as well as to content information related thereto. Each web page indicated in the database may be associated with one or more indexes.

According to some embodiments of the present invention, the query builder may search for correlations between the selected category and the indexes of the web pages indicated in the database. The web pages that were identified as associated with indexes that correlate to the selected category may then be analyzed according to other browsing statistics thereof to determine interrelations between them. Interrelations between nodes in the query scenario and therefore the structure of the logic tree thereof may be determined according to browsing statistics also stored in the database. The nodes of the query scenario may include search terms, where each search term may be taken and/or deduced from search queries associated with the web pages in the database. Each web page may be associated with a query history indicative of search terms used to access the webpage. Each search term may be associated with an up-to-date weight or ranking indicative of a statistical relative value of the search term in relation to other associated search terms. This may allow determining the hierarchal structure of the query scenario by, for instance, assigning a tree branch to each group of search terms associated with each web page having a correlated indexing, where the nodes structure and order are determined according to the ranking level of each search term, such that the last node of each branch is of the highest ranking.

According to some embodiments of the present invention, as further illustrated in FIG. 5, once the query scenario is built, it is presented to the user to allow him/her to manually select a node therefrom 75 for defining and creating the entire search query 76. The search query defined by the selected node may include all search terms in the branch associated with the selected node up to the point of the selected node.

Meaning that if the selected node is not an edge node of the branch, only the search term preceding the selected node will be included in the search query. The search query may further include information or structure indicative of "term-relations" between the search terms. The search relations may be any logical and/or linguistic relations such as "and", "or" and "and/or" logical relations, priorities between the terms, and the like. Any kind of relations between search terms that is used in searches through webs may be used to define the term-relations.

The search query may be presented to the user 76 optionally in order to allow the user to either accept the search query 77 and/or edit the search query if it is unaccepted by the user 78. The editing may include, for instance, removing some of the search terms, adding additional search terms, changing some of the term-relations between the search terms etc. A queries database may be updated with every search query that has been created by the above specified process 79 to allow additional or alternative statistical analysis according to which query scenarios can be built.

Once the search query is accepted 77, it may be used for searching through the web or any other information network based source and any type of search engine, using the search terms and term-relations therebetween to carry out the search 80.

Figure 6:
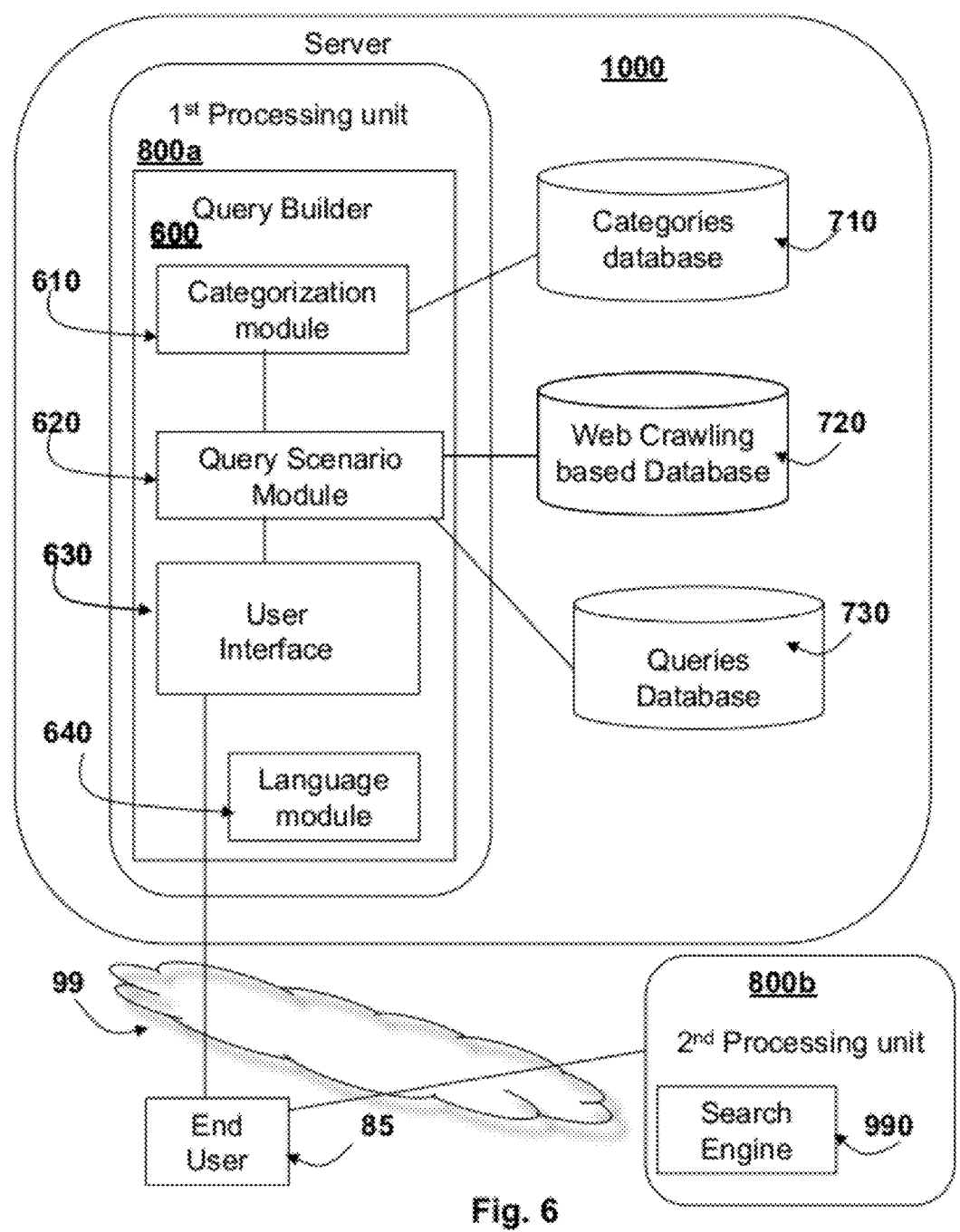
FIG. 6 is a block diagram, schematically illustrating a system for building a search query and supporting query building and searching processes, according to some embodiments of the present invention.

Reference is now made to FIG. 6, which is a block diagram, schematically illustrating a system for building a search query and supporting query building and searching processes, according to some embodiments of the present invention.

The system includes a computerized unit 1000 such as a server having one or more processing units such as a first processing unit 800a. First processing unit 800a enables operating a query builder 600, which is a computer readable tool for assisting and supporting users in building effective search queries for web searches purposes.

According to some embodiments of the present invention, query builder 600 includes a categorization module 610, a query scenario module 620 and a graphical user interface (GUI) 630. GUI 630 enables interfacing query builder 600 with end users 85 through one or more communication links such as link 99, for enabling the users to input data and to present data to the users through any kind of presentation mechanism.

Categorization module 610 may receive an input query text and build/retrieve a categories scenario corresponding thereto and/or present a general categories scenario tree that is updated according to latest statistical information.

According to some embodiments of the present invention, as mentioned above, the categories scenario is a logic tree constructed of category nodes. The hierarchal structure of the tree (i.e. the branches of nodes and order thereof) represents statistical interrelations between the category nodes. The statistics may relate to browsing history through categories, statistical studies of web page indexing, etc. The statistical studies that may be used include, for instance, search history by category and/or various sociological studies and/or information extracted from internet (web) forums, article etc. and have been analyzed to enable categorization of terms.

The system may include one or more categories databases such as categories database 710 that contains categories and indication of the statistical interrelations between them allowing categorization module 610 to construct a categories scenario corresponding to an input text by enabling to identify categories that are associated with at least part of the input text (e.g. at least one word therefrom, and the like), where the hierarchal structure of the categories scenario is determined according to the statistical interrelations between the categories.

The categories scenario tree is presented to the user through GUI 630 allowing the user to select a tree node indicative of a category that the user feels is most compatible with his/her search. The selection of the compatible category may automatically initiate a process in which query scenario module 620 builds a query scenario on-the-fly according to the selected category as well as according to various updated browsing and indexing statistics. This may be done by retrieving data from one or more databases such as database 720, which includes information relating to visited web pages that is indicative of (i) the webpage itself (e.g. URL thereof or link thereto); (ii) indexing of the webpage (may include more than one indexes for each webpage); and (iii) statistical features related to each visited webpage such as a list of search terms used to access the webpage and a weight factor indicative of how many times each term was used in relation to the specific webpage. As specified above, the query scenario is also a logic tree constructed of branches of search terms nodes, where the hierarchal structure of the query scenario is determined according to statistical interrelations between the search terms in correspondence with the selected category.

The query and/or categories scenarios presentation may be a presentation of a tree structure having a core stem and branches branching out therefrom, each stem can have other stems extracting therefrom, where the nodes are connected to the stems. The interrelations between the nodes are visually indicated by their respective locations on the branches they are connected to. Since some of the nodes are connected to branches having preceding nodes interrelated thereto, all the preceding nodes interrelated to the selected one can be taken into account for constructing the search query and/or for defining the category.

The query scenario is presented to the user through GUI 630 allowing the user to select a search term node (e.g. by clicking upon the node presentation area), which automatically defines the entire set of search terms of the search query. All the search terms of all the nodes that are related to the selected one through the tree branching are considered in the search query, where their location in the tree in relation to the selected node may determine: (i) term-relations between the search terms of the search query such as "and", "or" relations; and/or (ii) a weight or ranking assigned to each search term according to its location in the branches in respect to the location of the selected term, where the selected search term receives the highest ranking and the farthest search term receives the lowest ranking.

The search terms and term-relations there between may then be used in searching for web pages through the web that are most relevant—meaning that will include information that is most relevant to the user.

Optionally, query builder 600 presents the user with the search query created and further allows the user to edit the search query by, for instance, allowing the user to remove and add search terms and/or change interrelations between the search terms.

The search query may be presented as a raw of search terms with term-relations indicated between each pair of adjacent terms where the order of the terms represents their ranking order, such as: padded seats "and/or" bicycle seats "or" silicon seats "and" bicycle.

Query builder 600 may be any computer readable software and/or hardware based application or tool such as a web application, a client application and the like. Query builder 600 can optionally be embedded in one or more search engines allowing users to use it for constructing their search queries. Alternatively or additionally, query builder 600 may be operatively associated with a multiplicity of online available search engines enabling to link directly thereto.

Additionally or alternatively, the system may also include one or more queries databases such as queries database 730 for allowing storing all search queries built by query builder 600 and for allowing improving or even optionally replacing statistics originating from web crawling and indexing based browsing statistics with statistics of search queries built by query builder 600.

According to some embodiments of the present invention, as illustrated in FIG. 6, query builder 600 may additionally include a language module 640 for allowing presenting queries in various languages. Language module 640 may enable at least one of: (i) translating each query scenario and/or each categories scenario into a selected language according to the users' choice of language based on databases such as databases 710, 720 and/or 730 that may contain data stored in one or more languages; and/or (ii) upon building and presenting of a query scenario in a first language building/retrieving one or more equivalent query scenarios in other languages.

The latter option may be enabled by translating some or all of the terms of all the nodes in the query scenario into each selected other language (selected by the user using a GUI selection option, for example) and looking for scenario trees of the selected language to find the one that includes the most parallel terms as its nodes and retrieve and present this equivalent query scenario tree. Additionally or alternatively, the interrelations between the terms in the scenario trees of the other language may be checked where a designated compatibility algorithm may be used to check the equivalency or compatibility level between the query scenario of the original language and the ones of the other language, where the scenario of the highest compatibility level will be selected to be presented to the user as the equivalent query scenario.

Additionally or alternatively, another designated algorithm may search through a database in the other language comprising search terms and indications of interrelations therebetween for synonymous terms of each search term word and correlate these interrelations information with the search terms translation synonyms to build an equivalent query scenario.

This may allow accumulating statistical information based on web searches in more than one language thereby increasing the number of web searches and variety of web users, and thereby improving statistical analysis and resulting query accuracy and relevancy based thereon. Language module 640 further allows presenting the translated respective categories and/or query scenario to the user using GUI 630 to carry out the language selection and scenario presentation.

According to some embodiments, query builder 600 may further allow a user to retrieve and view search queries from queries database 730. For example, query builder 600 may allow each user to open a personal account allowing him/her to create, store and retrieve search queries build by the user and/or all search queries relating to the specific language.

According to some embodiments of the present invention, query builder 600 is operatively associated with one or more search engines such as search engine 990. Search engine 990 may be operated through a different second processing unit 800*b* enabling the user to save search queries he has built using query builder 600 for searching through the when using search engine 990.

Figure 7A:
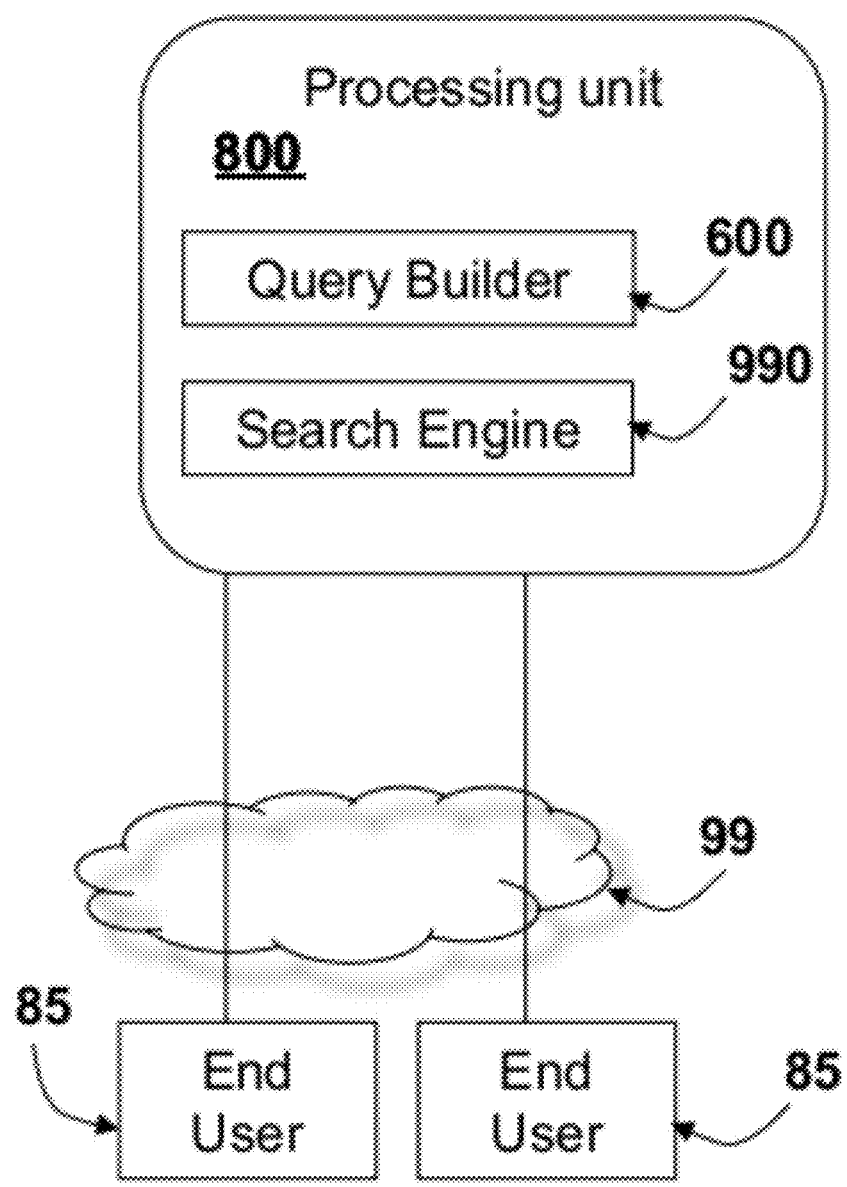
FIG. 7 is a block diagram, schematically illustrating the system substantially as described in FIG. 6, where the query builder and search engine are operated by the same processing unit.
Figure 7B:
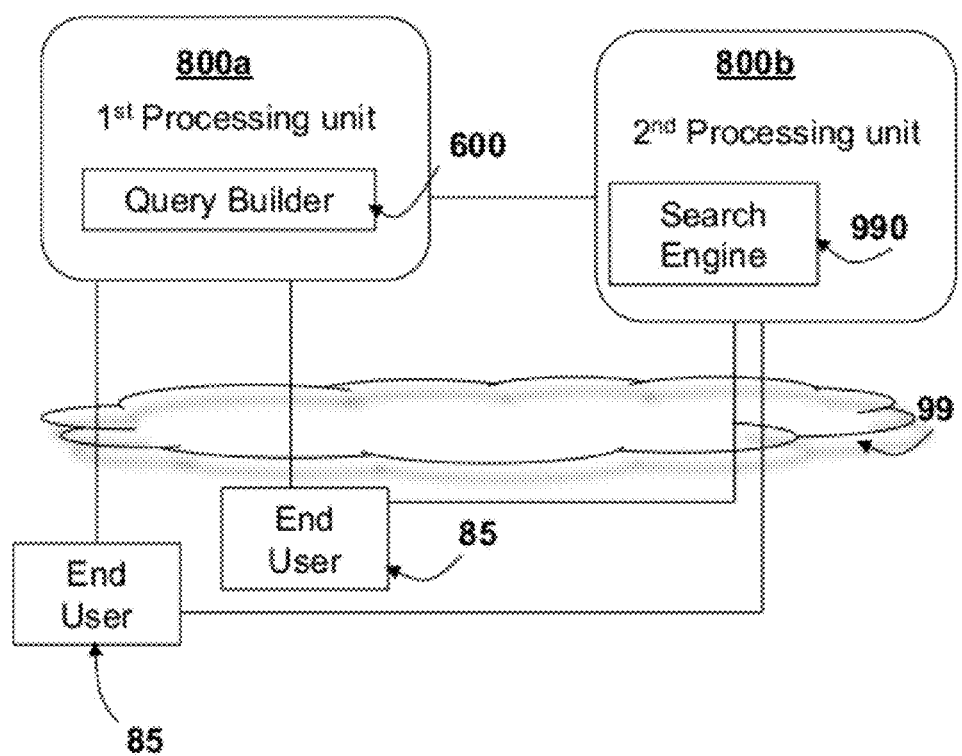

FIG. 7 is a block diagram, schematically illustrating a system similar to the one described in FIG. 6, where query builder 600 and search engine 990 are operated by the same processing unit 800. In this case, query builder 600 automatically inputs the search query built thereby and operates the web search option of search engine 990 saving the user the time in carrying pout those operations himself/herself.

The query builder may be operated according to other alternative or additional configurations using one or more processing units to carry out each function therefore. Any one or more communication links, protocols and/or networks may be used to allow communication with the end users and/or with other processing units operatively associated with the query builder. The query builder may be any software, hardware, and/or combination thereof that can receive, retrieve, process and present data such as a web application operated by one or more web servers, a client application and the like.

While the invention has been described with respect to a limited number of embodiments, these should not be construed as limitations on the scope of the invention, but rather as exemplifications of some of the embodiments. Accordingly, the scope of the invention should not be limited by what has thus far been described, but by the appended claims and their legal equivalents.

What is claimed is:

1. A system for supporting query building processes said system comprising:
   at least one database including browsing and indexing information relating to visited web pages;
   at least one processing unit of at least one server, said processing unit comprising:
   (i) a categorization module, which allows constructing a categorization scenario, which is a logic tree of search categories, wherein said categorization scenario represents statistical relations between categories, allowing the user to select a category therefrom; and
   (ii) a query scenario module, which receives a selected category and dynamically builds a query scenario corresponding to said selected category, said query scenario is a logic tree having nodes of search terms structured in a hierarchal manner that represents interrelations between said search term nodes, said interrelations are determined according to said selected category and according to browsing statistics relating to searches done by users, wherein upon selection of a node therefrom a search query is automatically created, said search query comprises all search terms that are interrelated to said selected node according to the hierarchal structure of said query scenario,
   wherein the search terms in the query scenario are determined by assigning a correlation level to each of said web pages' indexes, each said correlation level defines the correlation between the selected category and the index of each of the web pages indicated in said database, wherein said search terms are associated with web pages having a correlation level that is above a threshold value, and wherein the interrelations between the search terms defining the hierarchal structure of said query scenario are determined according to browsing statistics of the associated web pages.

2. The system according to claim 1 further comprising a graphical user interface (GUI), which allows presenting categories and query scenarios to users using end user devices and for allowing the users to select nodes and input data thereby.

3. The system according to claim 2, wherein said GUI further enables presenting the search query to the user and allowing the user to edit at least one of: the search terms of the search query, the interrelations between the search terms.

4. The system according to claim 1, wherein said query scenario module further enables determining term-relations between all search terms of each created search query according to the interrelations between those terms as defined by the hierarchal structure of the respective query scenario.

5. The system according to claim 4, wherein said query scenario module further enables storing all search terms of each created search query and the term-relations therebetween for enhancing browsing statistics and using said saved search queries in determining structure of query scenarios.

6. The system according to claim 4 is operatively associated with at least one search engine, said search engine receives said search query indicative of term-relations between the search terms thereof from said query builder and uses said search query for searching through at least one communication network for information relating to the search query, using at least one searching technique.

7. The system according to claim 1 further comprising a language module for allowing presenting the user with equivalent query scenarios in other languages selected by the user, upon the building of an original query scenario at a first language, by retrieving or building an equivalent query scenario of said original first query scenario according to translations of search term of the original query scenario.

8. A computer implemented method of supporting search queries building processes, said method comprising:
   providing a categorization scenario, which is a logic tree of search categories, said categorization scenario represents statistical relations between categories, using a query builder operated by at least one processing unit to create and present said categorization scenario;
   manually selecting a category from said categories scenario by selecting a node therefrom, wherein a user selects said category;
   dynamically building a query scenario corresponding to said selected category, said query scenario is a logic tree having nodes of search terms structured in a hierarchal manner that represents interrelations between said search term nodes, said interrelations are determined according to said selected category and according to browsing statistics, wherein said query builder builds and presents said query scenario;
   manually selecting a node of said query scenario to define a search query thereby, wherein the user selects said category; and
   automatically creating a search query comprising all search terms related to said node according to the hierarchal structure thereof, wherein said query builder creates said search query,
   wherein said steps are carried out using at least one processing unit of at least one server, and
   wherein the search terms in the query scenario are determined by using an algorithm that assigns a correlation level to each of said web pages' indexes, each said correlation level defines the correlation between the selected category and the index of each of the web pages indicated in a designated database including browsing and indexing information relating to visited web pages, wherein said search terms are associated with web pages having a correlation level that is above a threshold value, and wherein the interrelations between the search terms defining the hierarchal structure of said query scenario are determined according to browsing statistics of the associated web pages.

9. The method according to claim 8, wherein said interrelations between nodes of search terms are determined by correlating said selected category with indexes of web pages and by using statistical browsing information, using at least one database indicative of browsing and indexing information relating to visited web pages.

10. The method according to claim 8 further comprising determining term-relations between all search terms of each created search query according to the interrelations between those terms as defined by the hierarchal structure of the respective query scenario.

11. The method according to claim 10 further comprising storing all search terms of each created search query and the term-relations therebetween for enhancing browsing statistics and for using said saved search queries in determining structure of query scenarios.

12. The method according to claim 10 further comprising receiving said search query indicative of term-relations between the search terms thereof from said query builder and searching through at least one communication network for information relating to the search query, using said search query, using at least one searching technique.

13. The method according to claim 8 further comprising presenting the search query to the user and allowing the user to edit at least one of: the search terms of the search query, the interrelations between the search terms.

14. A system for supporting query building processes, said system comprising:
   at least one database comprising categories and information associated with interrelations between said categories for enabling to construct categories scenarios thereby; and
   at least one processing unit that operates a query builder, which enables assisting a user in building a search query by constructing a categorization scenario using said database and presenting thereof to the user, said categories scenario is a logic tree of search categories, which represents statistical relations between categories and dynamically building a query scenario for each category defined by the user by selecting a category form said categories scenario, said query scenario is a logic tree having nodes of search terms structured in a hierarchal manner that represents interrelations between said search term nodes, said interrelations are determined according to said selected category and according to browsing statistics relating to searches done by users, wherein upon selection of a node therefrom a search query is automatically created, said search query comprises all search terms that are interrelated to said selected node according to the hierarchal structure of said query scenario wherein the search terms in the query scenario are determined by using an algorithm that assigns a correlation level to each of said web pages' indexes, each said correlation level defines the correlation between the selected category and the index of each of the web pages indicated in said database, wherein said search terms are associated with web pages having a correlation level that is above a threshold value, and wherein the interrelations between the search terms defining the hierarchal structure of said query scenario are determined according to browsing statistics of the associated web pages.

* * * * *